W. H. A. THEED AND A. T. PHILLIPS.
METHOD OF MAKING LINERS FOR REENFORCING THE COVERS OF PNEUMATIC TIRES.
APPLICATION FILED JUNE 3, 1920.

1,421,616.  
Patented July 4, 1922.

UNITED STATES PATENT OFFICE.

WILLIAM HENRY ALEXANDER THEED, OF SOUTH KENSINGTON, AND ARTHUR THOMAS PHILLIPS, OF HAMMERSMITH, ENGLAND.

METHOD OF MAKING LINERS FOR REENFORCING THE COVERS OF PNEUMATIC TIRES.

1,421,616. Specification of Letters Patent. Patented July 4, 1922.

Application filed June 3, 1920. Serial No. 386,384.

*To all whom it may concern:*

Be it known that we, WILLIAM HENRY ALEXANDER THEED, a subject of the King of Great Britain and Ireland, residing at the Alveston Motor Garage, Roland Gardens, South Kensington, in the administrative county of London, England, and ARTHUR THOMAS PHILLIPS, a subject of the King of Great Britain and Ireland, residing at 7 Bothwell Street, Lillie Road, Hammersmith, in the county aforesaid, have invented a new and useful Improvement in the Method of Making Liners for Reenforcing the Covers of Pneumatic Tires, of which the following is a full and complete specification.

This invention relates to liners or the like for inserting between the covers and air tubes of pneumatic tires for the purpose of reinforcing said covers and it has for its object the production of a liner or the like which will fit more snugly in the cover of a tire by reason firstly, of its more correct shape, and secondly, of all the stretch being previously taken out of the material of which it is made.

We attain this object by constructing the liners or the like out of old or discarded covers of pneumatic tires which are treated in the manner hereinafter described with reference to the accompanying drawing in which:—

Figure 1:
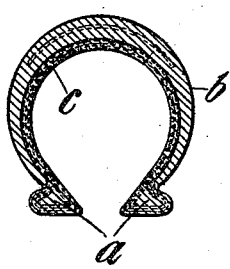

Fig. 1 is a view in transverse section of an old cover of a pneumatic tire before treatment. Figs. 2, 3, 4 and 5, are views showing the various stages in the treatment of the cover to produce the liner, the latter figure showing the ends of a completed liner, the band being flattened out so as to show the final shape more clearly.

Throughout the views similar parts are marked with like letters of reference.

Figure 2:

The first step is to remove the thickened edges *a* and *a* and the tread *b* of the cover, the former by cutting and the latter by stripping or buffing, leaving the foundation *c*—which as is well known consists of a plurality of layers of fabric adhering to one another—as shown in Fig. 2.

Figure 3:
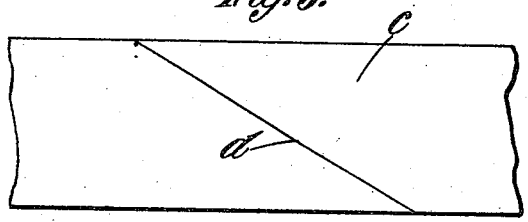

The next step is to cut the foundation *c* across—preferably diagonally as shown at *d* in Fig. 3—so as to form an open ended band. If the old cover has been damaged this cut is made so as to cut out said damaged part.

Figure 4:
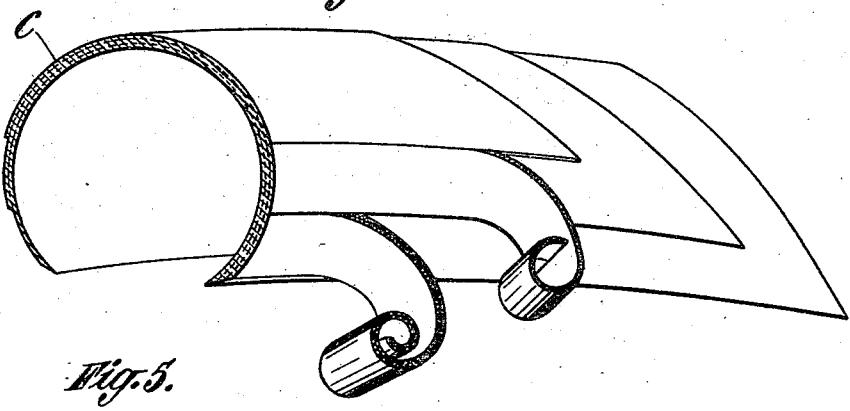

The third step is to scarf or step the sides of the band by successively cutting and stripping a piece off each edge of each layer of the material forming the foundation so as to gradually reduce the thickness of the band towards its edges as shown in Fig. 4, and to similarly treat the ends of the band so as to gradually reduce the thickness of the band both transversely and longitudinally at said ends.

Figure 5:
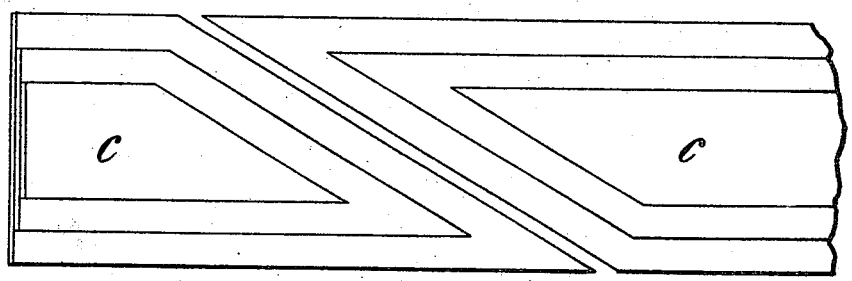

The scarfing of the ends of the band may be on the same side as shown in Fig. 5 or on opposite sides of the band. While the latter forms the most perfect joint the former is the preferred method, as although it does not make such an even joint there are no objections to it in use and it is more easily made as it does not involve reversing the band during the process of manufacture.

Lastly the outer surface of the band so formed is then coated with a rubber solution such for example as a compound of rubber, solvent naptha and vegetable black which dries hard but which will when fitted within the cover of a tire—due to the heat generated in the cover of the tire when running—become plastic and automatically cause the liner to adhere and become fixed to the inner face of the cover of the tire.

It will be appreciated that as these lines are made out of covers of tires which have been in use they have had all the stretch permanently taken out of them and that their shape is more perfect than could be attained by any method of building up on formers or the like.

As these liners lie inside the cover of a tire a liner made out of a given size of cover will be long enough—even after cutting out a damaged part such as would be produced by a burst—to fit in a cover of the same size due to the difference between the circumferential lengths of the outer and inner surfaces of the covers of tires.

What we claim is:—

The process of making liners for reenforcing the covers of pneumatic tires from old or disused covers of such tires consisting in removing the beaded or thickened edges and the tread of the cover, cutting the foundation of the cover across so as to form an open ended band, and scarfing or stepping both the sides and the ends of the band by cutting and stripping successive layers of the fabric forming the foundation, substantially as herein described.

WILLIAM HENRY ALEXANDER THEED.
ARTHUR THOMAS PHILLIPS.